US011984666B2

(12) United States Patent
Xu et al.

(10) Patent No.: US 11,984,666 B2
(45) Date of Patent: May 14, 2024

(54) RADIATION ELEMENT AND BANDWIDTH EXTENSION STRUCTURE

(71) Applicant: RFS Technologies, Inc., Meriden, CT (US)

(72) Inventors: Jiankai Xu, Shanghai (CN); Ke Chen, Shanghai (CN); Chunhua Zhou, Shanghai (CN); Jing Liu, Shanghai (CN); Jihong Sun, Shanghai (CN)

(73) Assignee: RFS Technologies, Inc., Meriden, CT (US)

( * ) Notice: Subject to any disclaimer, the term of this patent is extended or adjusted under 35 U.S.C. 154(b) by 0 days.

(21) Appl. No.: 16/758,762

(22) PCT Filed: Nov. 2, 2018

(86) PCT No.: PCT/CN2018/113679
§ 371 (c)(1),
(2) Date: Apr. 23, 2020

(87) PCT Pub. No.: WO2019/091340
PCT Pub. Date: May 16, 2019

(65) Prior Publication Data

US 2021/0184352 A1 Jun. 17, 2021

(30) Foreign Application Priority Data

Nov. 9, 2017 (CN) ............................ 201711098031

(51) Int. Cl.
*H01Q 5/307* (2015.01)
*H01Q 1/24* (2006.01)

(52) U.S. Cl.
CPC ............. *H01Q 5/307* (2015.01); *H01Q 1/246* (2013.01)

(58) Field of Classification Search
CPC ......... H01Q 21/26; H01Q 1/246; H01Q 5/307
See application file for complete search history.

(56) References Cited

U.S. PATENT DOCUMENTS 3,653,053 A * 3/1972 St. Vrain .................. H01Q 9/14 343/745
6,542,128 B1 * 4/2003 Johnson ................... H01Q 9/28 343/826

(Continued)

FOREIGN PATENT DOCUMENTS

CN 103036073 A 4/2013
CN 103872435 A 6/2014

(Continued)

OTHER PUBLICATIONS

International Search Report for PCT/CN2018/113679 dated Jan. 30, 2019.

(Continued)

*Primary Examiner* — Daniel Munoz
(74) *Attorney, Agent, or Firm* — Wolf, Greenfield & Sacks, P.C.

(57) ABSTRACT

An object of the present disclosure is to provide a radiation element and a bandwidth extension structure. The radiation element according to the present disclosure comprises: a basic radiation element and one or more bandwidth extension structures; wherein the one or more bandwidth extension structures are mounted on the basic radiation element to extend the operating bandwidth of the basic radiation element. The bandwidth extension structure according to the present disclosure is mounted on the basic radiation element to extend the operating band of the basic radiation element. Compared with the prior art, the present disclosure has the following advantages: the radiation element according to the present disclosure has one or more bandwidth extension structures to extend the operating bandwidth of the basic radiation element, such that by combining the plurality of bandwidth extension structures and the basic radiation element, the radiation element may work well at bands beyond its original operating band, which eliminates the need of (Continued)

using a plurality of basic radiation elements due to different operating bandwidths as required, thereby saving costs.

27 Claims, 5 Drawing Sheets

(56) References Cited

U.S. PATENT DOCUMENTS

| | | | | |
|---|---|---|---|---|
| 2005/0253769 | A1* | 11/2005 | Timofeev | H01Q 21/26 343/797 |
| 2007/0254587 | A1* | 11/2007 | Schadler | H01Q 21/24 455/13.3 |
| 2009/0128442 | A1 | 5/2009 | Fujita et al. | |
| 2012/0268326 | A1 | 10/2012 | Kai et al. | |
| 2015/0194739 | A1 | 7/2015 | Chen et al. | |
| 2016/0248161 | A1 | 8/2016 | Ziv | |
| 2018/0331419 | A1* | 11/2018 | Varnoosfaderani | H01Q 21/0006 |

FOREIGN PATENT DOCUMENTS

| | | | |
|---|---|---|---|
| CN | 2057521538 | U | 11/2016 |
| CN | 205985337 | U | 2/2017 |
| CN | 207381521 | U | 5/2018 |

OTHER PUBLICATIONS

International Preliminary Report on Patentability for International Application No. PCT/CN2018/113679 dated May 22, 2020.

Extended European Search Report for European Application No. 18875825.4 dated Jul. 19, 2021.

* cited by examiner

RADIATION ELEMENT AND BANDWIDTH EXTENSION STRUCTURE

CROSS-REFERENCE TO RELATED APPLICATIONS

This Application is a national stage filing under 35 U.S.C. § 371 of International Patent Application Serial No. PCT/CN2018/113679, filed on Nov. 2, 2018, which claims priority to Chinese Patent Application No. 201711098031.5, filed on Nov. 9, 2017.

TECHNICAL FIELD

The present disclosure relates to the field of communication technologies, and more particularly to a radiation element and a bandwidth extension structure.

BACKGROUND

Radiation element is an element constituting an antenna basic structure. At present, high gain radiation element could not work well in broadband. It is very difficult to match in broadband with current radiation element. Mismatched radiation element will cause the amplitude and phase distribution inconsistency, so the radiation pattern will deform during the broad frequency band. Especially the radiation side lobe which is not suppressed well will lead to the interference between two adjacent base stations.

The best existing solution is to design different radiation elements for different frequency band. The radiation element can only work in its certain corresponding frequency band, and cannot work in a wider band. If required frequency band changes, a new radiation element have to be designed to match it. Otherwise, the radiation patterns or the voltage standing wave ratio will get worse.

SUMMARY

An object of the present disclosure is to provide a radiation element and a bandwidth extension structure.

According to an aspect of the present disclosure, a radiation element is provided, comprising: a basic radiation element and one or more bandwidth extension structures;

wherein the one or more bandwidth extension structures are mounted on the basic radiation element to extend the operating bandwidth of the basic radiation element.

According to another aspect of the present disclosure, a bandwidth extension structure is provided, wherein the bandwidth extension structure is mounted on a basic radiation element to extend the operating band of the basic radiation element.

According to a further aspect of the present disclosure, an antenna device is provided, comprising a radiation element according to the present disclosure.

According to a still further aspect of the present disclosure, a method for manufacturing a bandwidth extension structure is provided, comprising steps of:

determining the shape and the size of a to-be-manufactured bandwidth extension structure based on the size of the basic radiation element and the operating band that needs to be extended.

manufacturing the corresponding bandwidth extension structure based on the determined shape and size.

Compared with the prior art, the present disclosure has the following advantages: the radiation element according to the present disclosure has one or more bandwidth extension structures to extend the operating bandwidth of the basic radiation element, such that by combining the plurality of bandwidth extension structures and the basic radiation element, the radiation element may work well at bands beyond its original operating band, which eliminates the need of using a plurality of basic radiation elements due to different operating bandwidths as required, thereby saving costs.

BRIEF DESCRIPTION OF THE ACCOMPANYING DRAWINGS

Other features, objectives and advantages of the present disclosure will become more apparent through reading the detailed description of the non-limiting embodiments with reference to the accompanying drawings.

In the accompanying drawings, same or similar reference numerals represent same or like components.

DETAILED DESCRIPTION OF THE PREFERRED EMBODIMENTS

Hereinafter, the present disclosure will be described in further detail with reference to the accompanying drawings.

The radiation element according to the present disclosure comprises a basic radiation element and one or more bandwidth extension structure.

Specifically, the radiation element is provided in an antenna device of a base station, the base station including, but not limited to a macro base station, a micro base station, and a home base station, etc.

Specifically, the one or more bandwidth extension structures are mounted on the basic radiation element to extend an operating bandwidth of the basic radiation element.

Preferably, the bandwidth extension structure is mounted on a radiation arm of the basic radiation element, the size of the bandwidth extension structure being adapted to the size of the radiation arm.

Preferably, there are one or more mounting holes on the radiation arm, to fasten the bandwidth extension structure on the basic radiation element. For example, the bandwidth extension structure may be fastened to the basic radiation element through the mounting hole of the radiation arm using a plastic rivet.

Preferably, the radiation unit further comprises an insulation structure located between the bandwidth extension structure and the basic radiation element to thereby prevent direct contact between the bandwidth extension structure and the basic radiation element.

Specifically, the insulation structure may adopt various kinds of insulation materials, e.g., plastic or resin, etc.

It needs to be noted that those skilled in the art should appreciate that a plurality of ways may be adopted to mount the bandwidth extension structure onto the basic radiation element, not limited to the above manner of mounting the bandwidth extension structure onto the basic radiation element through the mounting hole in the radiation arm. Those skilled in the art may select an appropriate manner to adhere the bandwidth extension structure onto the basic radiation element based on actual needs.

Specifically, the bandwidth extension structure according to the present disclosure is mounted on the basic radiation element to extend the operating band of the basic radiation element.

Preferably, there are one or more mounting holes on the radiation arm, to fasten the bandwidth extension structure on the basic radiation element.

Preferably, the bandwidth extension structure is a U-shaped or L-shaped metal plate.

Figure 1:
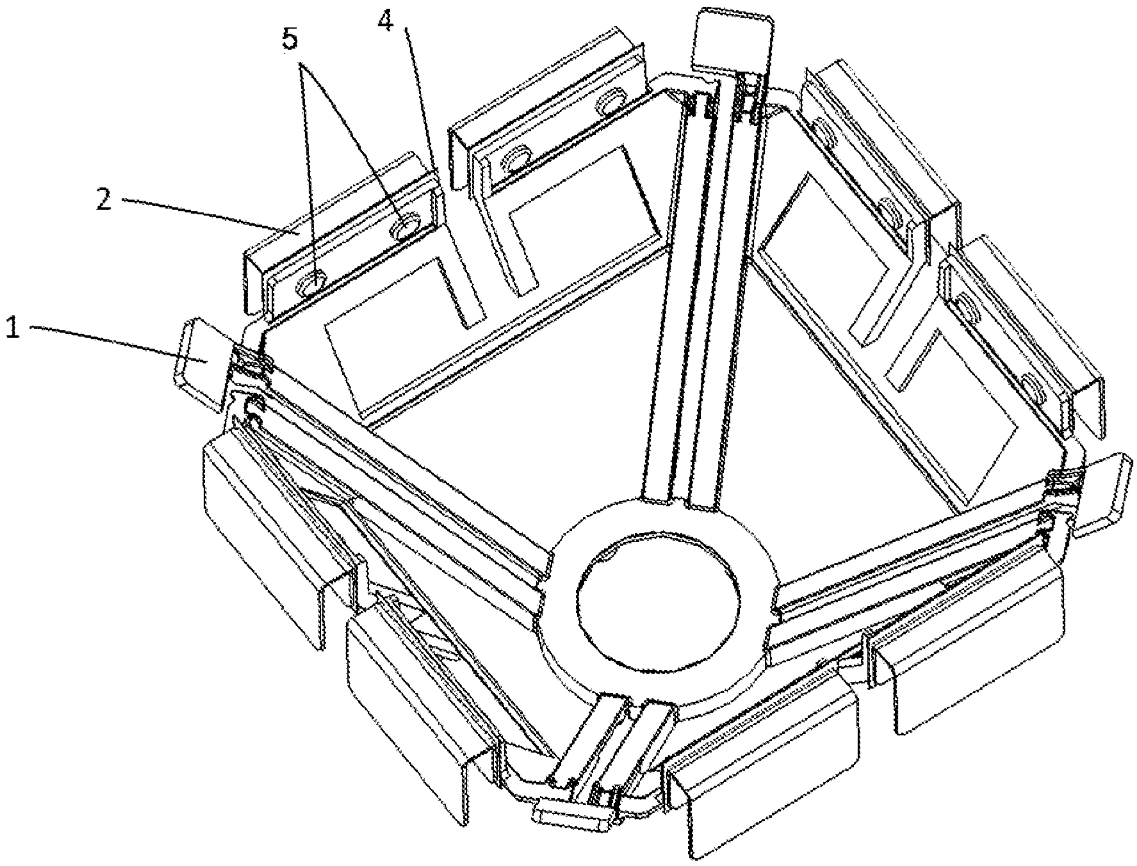
FIG. 1 shows a structural schematic diagram of an exemplary radiation element according to the present disclosure.
Figure 2:
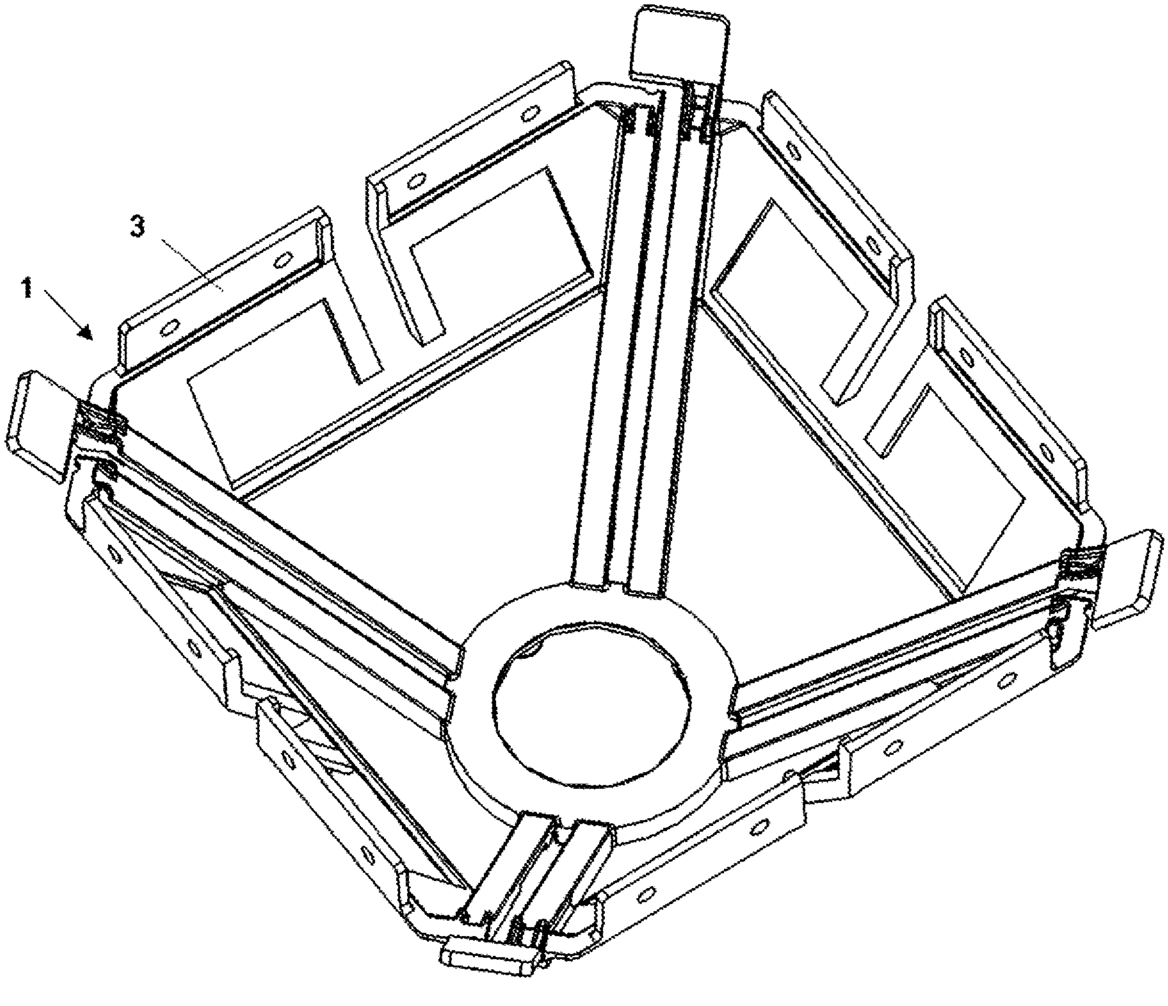
FIG. 2 shows a structural schematic diagram of an exemplary basic radiation element according to the present disclosure.
Figure 3:
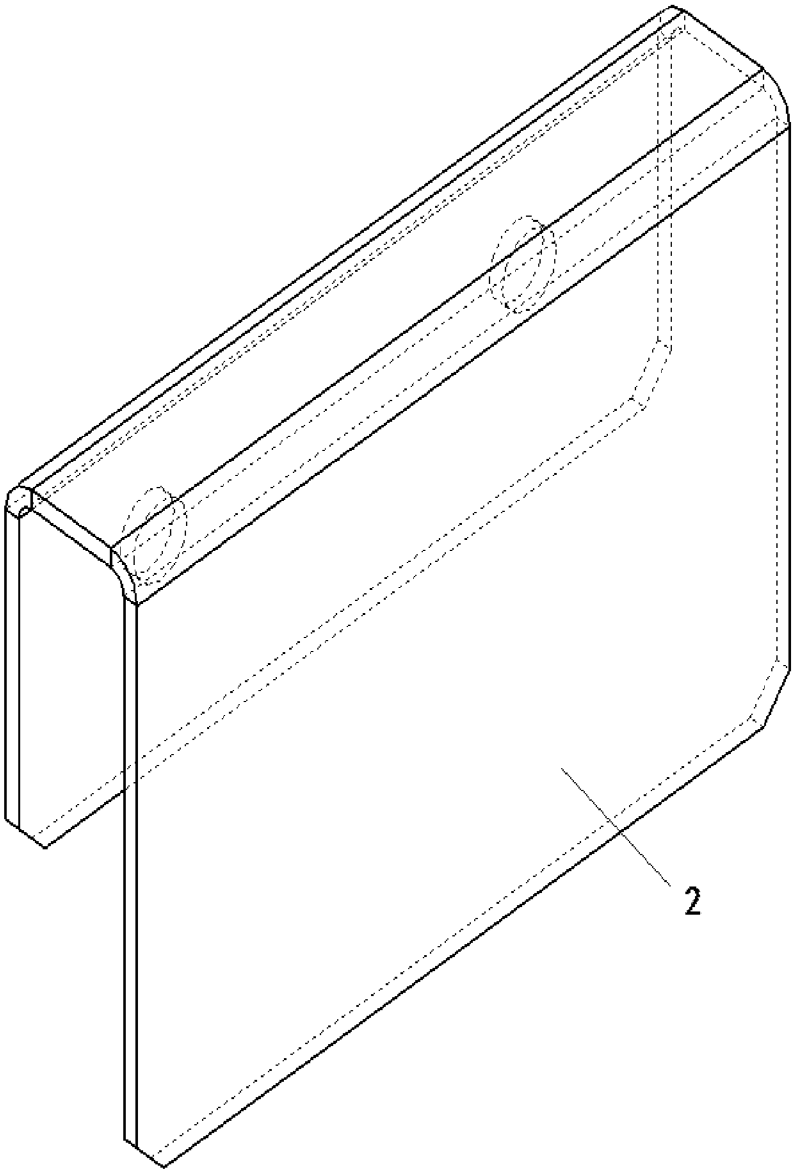
FIG. 3 shows a structural schematic diagram of an exemplary bandwidth extension structure according to the present disclosure.

FIG. 1 to FIG. 3 shows the structural schematic diagrams of an exemplary radiation element, an exemplary basic radiation unit, and an exemplary bandwidth extension structure according to the present disclosure, respectively.

With reference to FIG. 1 to FIG. 3, the radiation element shown in FIG. 1 comprises one basic radiation element 1 as shown in FIG. 2 and eight bandwidth extension structures 2 as shown in FIG. 3.

The bandwidth extension structure 2 is a U-shaped metal plate mounted on the basic radiation element 1, to extend the operating band of the basic radiation element from band 690-960 MHz to band 600-960 MHz.

The bandwidth extension structure 2 is mounted on the radiation arm 3 of the basic radiation element 1, the size of the bandwidth extension structure being adapted to the size of the radiation arm. Two mounting holes are provided on each radiation arm, as shown in FIG. 2. Moreover, two mounting holes are provided for each bandwidth extension structure 2, as shown in FIG. 3. With reference to FIG. 1, the bandwidth extension structure 2 is fastened onto the basic radiation element 1 via the mounting hole using a plastic rivet 5.

The radiation element further comprises an insulation structure 4 that is an insulative diaphragm of plastic. The insulation structure 4 is located between the bandwidth extension structure 2 and the basic radiation element 1 to prevent direct contact between the bandwidth extension structure 2 and the basic radiation element 1.

Figure 4:
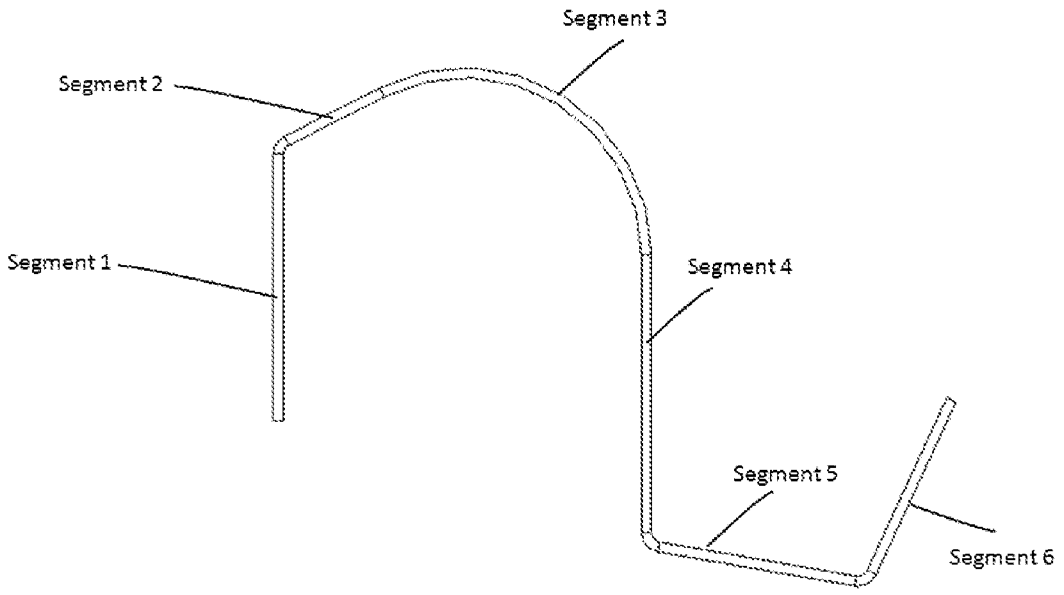
FIG. 4 shows a side view of an exemplary bandwidth extension structure according to the present disclosure.

FIG. 4 schematically shows a side view of an exemplary bandwidth extension structure according to the present disclosure.

With reference to FIG. 4, the bandwidth extension structure comprises six segments, segment 1 to segment 6. The side of each segment of the bandwidth extension structure may be straight or curved, and two segments of the bandwidth extension structure may be formed at any angle. The front of the bandwidth extension structure may be any shape, to be adapted to basic radiation elements of different shapes.

The radiation element of the present disclosure has one or more bandwidth extension structures to extend the operating bandwidth of the basic radiation element, such that by combining the plurality of bandwidth extension structures and the basic radiation element, the radiation element may work well at bands beyond its original operating band, which eliminates the need of using a plurality of basic radiation elements due to different operating bandwidths as required, thereby saving costs.

Figure 5:
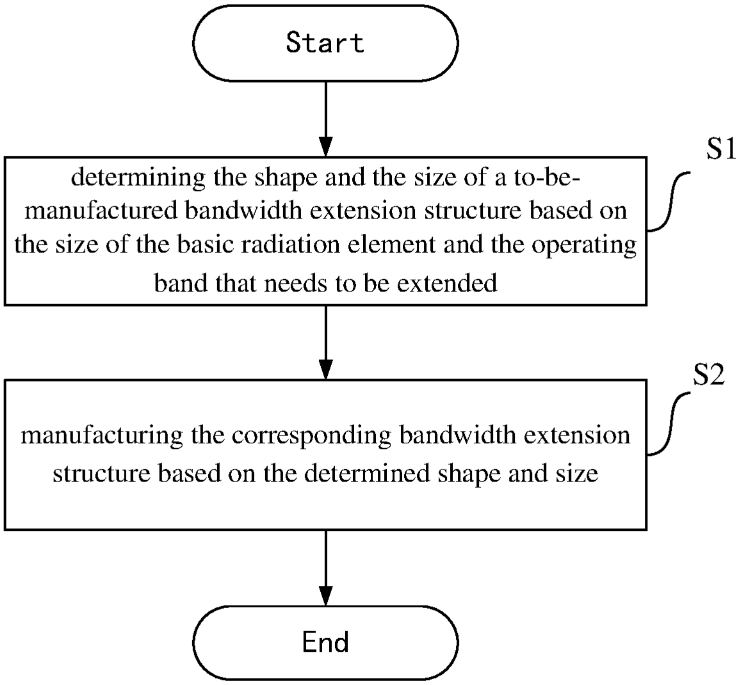
FIG. 5 shows a flow diagram of a method for manufacturing a bandwidth extension structure according to the present disclosure.

FIG. 5 schematically shows a flow diagram of a method for manufacturing a bandwidth extension structure according to the present disclosure. The method comprises step S1 and step S2.

With reference to FIG. 5, in step S1, the shape and the size of a to-be-manufactured bandwidth extension structure is determined based on the size of the basic radiation element and the operating band that needs to be extended.

In step S2, the corresponding bandwidth extension structure is manufactured based on the determined shape and size.

For example, with reference to FIGS. 2 and 3, to manufacture a U-shaped bandwidth extension structure of FIG. 3 adapted to the basic radiation element shown in FIG. 2, supposing the bandwidth to be extended is f, then the size of the bandwidth extension structure is determined based on the size of the radiation arm of the basic radiation unit, and the width of the U-shaped opening of the U-shaped bandwidth extension structure is determined based on f, thereby manufacturing the corresponding bandwidth extension structure.

According to the method of the present disclosure, the operating bandwidth of the basic radiation unit is extended by manufacturing a bandwidth extension structure, such that by combining the plurality of bandwidth extension structures and the basic radiation element, the radiation element may work well at bands beyond its original operating band, which eliminates the need of using a plurality of basic radiation elements due to different operating bandwidths as required, thereby saving costs.

To those skilled in the art, it is apparent that the present disclosure is not limited to the details of the above exemplary embodiments, and the present disclosure may be implemented with other embodiments without departing from the spirit or basic features of the present disclosure. Thus, in any way, the embodiments should be regarded as exemplary, not limitative. The scope of the present disclosure is limited by the appended claims, not by the description above; therefore, meanings of equivalent elements within the scope and all variations within the scope intend to be included in the present disclosure. No reference numerals in the claims should be regarded to limit the relevant claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

The invention claimed is:

1. An antenna device, comprising:

a plurality of radiating arms;

a plurality of metal plates that are U-shaped or L-shaped, wherein the plurality of metal plates are configured for capacitively coupling to the plurality of radiating arms, respectively; and a plurality of insulation structures respectively located between the plurality of metal plates and the plurality of radiating arms and configured to provide capacitive coupling between the plurality of metal plates and the plurality of radiating arms, respectively, and inhibit conductive coupling between the plurality of metal plates and the plurality of radiating arms, respectively, wherein the plurality of radiating arms are each configured to:

operate in a first frequency band when not capacitively coupled to the plurality of metal plates, respectively; and operate in a second frequency band that includes, and is larger than, the first frequency band when capacitively coupled to the plurality of metal plates, respectively.

2. The antenna device according to claim 1, wherein the plurality of metal plates are mounted on the plurality of radiating arms, respectively.

3. The antenna device according to claim 2, wherein each of the plurality of radiating arms comprises one or more mounting holes configured to fasten the respective metal plate on the radiating arm.

4. The antenna device according to claim 1, wherein each of the plurality of metal plates has a U-shape and an opening separating portions of the U-shape, a width of the opening configured to provide a difference in bandwidth between the first frequency band and the second frequency band.

5. A base station, comprising the antenna device according to claim 1.

6. The antenna device according to claim 1, wherein each of the plurality of metal plates comprises a first, second, third, fourth, fifth, and sixth segment, wherein a side of at least some of the first, second, third, fourth, fifth, and sixth segments of the metal plate is straight, a side of at least some of the first, second, third, fourth, fifth, and sixth segments is curved, and a pair of adjacent segments of the first, second, third, fourth, fifth, and sixth segments are formed at an angle.

7. The antenna device according to claim 6, wherein, in each of the plurality of metal plates, a segment of the first, second, third, fourth, fifth, and sixth segments is mounted and/or configured for capacitively coupling to the respective radiating arm and has a width adapted to a width of the radiating arm.

8. The antenna device according to claim 1, wherein the first frequency band is from 690-960 Megahertz (MHz) and the second frequency band is from 600-960 MHz.

9. The antenna device according to claim 8, wherein each of the plurality of metal plates comprises an opening separating portions of the metal plate, a width ofa the opening configured to provide a difference in bandwidth between the first frequency band and the second frequency band.

10. A method of extending a bandwidth of a radiating arm of an antenna device from a first frequency band to a second frequency band that includes, and is larger than the first frequency band, the method comprising:

mounting a metal plate on the radiating arm with an insulation structure therebetween, the radiating arm operating in the first frequency band without the metal plate and the insulation structure mounted thereto and operating in the second frequency band with the metal plate and the insulation structure mounted thereto, the metal plate having a U- or L-shape and size based on a size of the radiating arm and a difference in bandwidth between the first frequency band and the second frequency band, and the insulation structure providing capacitive coupling between the radiating arm and the metal plate and inhibiting conductive coupling between the radiating arm and the metal plate.

11. The method according to claim 10, wherein the metal plate has a U-shape and an opening separating portions of the U-shape, a width of the opening based on a difference in bandwidth between the first frequency band and the second frequency band.

12. An antenna device, comprising:

a plurality of radiating arms;

a plurality of metal plates that are U-shaped or L-shaped, wherein the plurality of metal plates are mounted on the plurality of radiating arms, respectively, with plastic rivets; and a plurality of insulation structures respectively located between the plurality of metal plates and the plurality of radiating arms and configured to provide capacitive coupling between the plurality of metal plates and the plurality of radiating arms, respectively, and inhibit conductive coupling between the plurality of metal plates and the plurality of radiating arms, respectively, wherein the plurality of radiating arms are configured to:

operate in a first frequency band when not capacitively coupled to the plurality of metal plates, respectively; and operate in a second frequency band that includes, and is larger than, the first frequency band when capacitively coupled to the plurality of metal plates, respectively.

13. The antenna device according to claim 12, wherein each of the plurality of radiating arms comprises one or more mounting holes configured to receive the plastic rivets to fasten the respective metal plate on the radiating arm.

14. A base station, comprising the antenna device according to claim 12.

15. The antenna device according to claim 12, wherein the plurality of metal plates are electrically separate from ground.

16. An antenna device, comprising:

a radiating arm;

a conductive plate with angled segments; and an insulation structure comprising an insulative diaphragm, wherein:

the radiating arm is configured for capacitively coupling to the conductive plate via the insulative diaphragm;

the insulative diaphragm is configured to inhibit conductive coupling between the radiating arm and the conductive plate;

the radiating arm is configured for a first operating band based on conductive coupling within the radiating arm; and the radiating arm is further configured for a second operating band that includes, and is larger than, the first operating band based on the conductive coupling within the radiating arm combined with capacitive coupling between the radiating arm and the conductive plate.

17. The antenna device according to claim 16, wherein the conductive plate is mounted on the radiating arm.

18. The antenna device according to claim 17, wherein the radiating arm comprises one or more mounting holes configured to fasten the conductive plate on the radiating arm.

19. The antenna device according to claim 16, wherein the conductive plate is U-shaped or L-shaped.

20. Abase station, comprising the antenna device according to claim 16.

21. An antenna device, comprising:

a first radiating arm;

a first metal plate with angled segments and mounted on the first radiating arm with first rivets;

a first insulation structure located between the first metal plate and the first radiating arm and configured to provide capacitive coupling between the first metal plate and the first radiating arm and to inhibit conductive coupling between the first metal plate and the first radiating arm;

a second radiating arm forming a dipole configuration together with the first radiating arm;

a second metal plate with angled segments and mounted on the second radiating arm with second rivets; and a second insulation structure located between the second metal plate and the second radiating arm and configured to provide capacitive coupling between the second metal plate and the second radiating arm and to inhibit conductive coupling between the second metal plate and the second radiating arm, wherein:

the first and second radiating arms are configured for a first operating band based on conductive coupling within the first and second radiating arms, respectively; and the first and second radiating arms are further configured for a second operating band that includes, and is larger than, the first operating band based on the conductive coupling within the first and second radiating arms combined with capacitive coupling between the first and second radiating arms and the first and second metal plates, respectively.

22. The antenna device according to claim 21, wherein:

the first radiating arm comprises one or more mounting holes configured to receive the first rivets and fasten the first metal plate on the first radiating arm; and the second radiating arm comprises one or more mounting holes configured to receive the second rivets and fasten the second metal plate on the second radiating arm.

23. A base station, comprising the antenna device according to claim 21.

24. The antenna device according to claim 21, wherein:

the first radiating arm has a portion disposed in a first plane;

a segment of the angled segments of the first metal plate is disposed in a second plane and mounted on the portion of the first radiating arm with the first rivets;

the first insulation structure is located between the segment of the first metal plate and the portion of the first radiating arm and configured to provide capacitive coupling between the segment of the first metal plate and the portion of the first radiating arm and to inhibit conductive coupling between the segment of the first metal plate and the portion of the first radiating arm;

the second radiating arm has a portion disposed in a third plane that is parallel to the first plane;

a segment of the angled segments of the second metal plate is disposed in a fourth plane that is parallel to the second plane and mounted on the portion of the second radiating arm with the second rivets; and the second insulation structure is located between the segment of the second metal plate and the portion of the second radiating arm and configured to provide capacitive coupling between the segment of the second metal plate and the portion of the second radiating arm and to inhibit conductive coupling between the segment of the second metal plate and the portion of the second radiating arm.

25. The antenna device according to claim 24, wherein the portion of the first radiating arm and the portion of the second radiating arm are aligned in a same plane and the segment of the first metal plate and the segment of the second metal plate are aligned in a same plane.

26. The antenna device according to claim 21, wherein the first operating band is from 690-960 Megahertz (MHz) and the second operating band is from 600-960 MHz.

27. A method of manufacturing an antenna device, the method comprising:

mounting a metal plate, having angled segments, on a radiating arm of the antenna device using plastic rivets and with an insulation structure between the metal plate and the radiating arm to provide capacitive coupling between the metal plate and the radiating arm and to inhibit conductive coupling between the radiating arm and the metal plate, such that a bandwidth of the radiating arm is extended from:

a first frequency band, without the metal plate mounted thereto and the insulation structure therebetween, to a second frequency band that includes and is larger than the first frequency band, with the metal plate mounted thereto and the insulation structure therebetween.

* * * * *